United States Patent Office 3,290,140
Patented Dec. 6, 1966

3,290,140
METHOD OF MIXING AND STORING SOLUTIONS COMPRISING AMMONIUM PHOSPHATE
Donald C. Young, Fullerton, Calif., assignor to Union Oil Company of California, Los Angeles, Calif., a corporation of California
No Drawing. Filed Nov. 7, 1963, Ser. No. 322,056
9 Claims. (Cl. 71—34)

This application is a continuation-in-part of my copending application, Serial Number 14,216, filed March 11, 1960 and now abandoned.

This invention relates to the storage and handling of ammonium phosphate solutions derived from wet process phosphoric acid by chelation of the metallic impurities contained therein with polyphosphate anions. In particular, this invention relates to a method for preventing such ammonium phosphate solutions from clouding or forming precipitates during storage or upon admixture with other ammonium salt solutions.

Wet process phosphoric acid contains many impurities incidental in its preparation which have, until recently, prevented its use for the manufacture of aqueous ammonium phosphate fertilizers. Among these impurities are organic matter, silicone, fluorine, and the carbonates and sulfates of various metallic ions such as iron, aluminum, magnesium, chromium, zinc, vanadium, etc. Particularly troublesome have been the metal cations that generally comprise from about 0.7 to 10 weight percent (calculated as oxides) of the acid at the conventional 52 weight percent $P_2O_5$ concentrations. These impurities are troublesome because they form insoluble phosphate salts when the acid is neutralized. These insoluble salts, particularly those of iron and aluminum, are gelatinous and extremely difficult to remove from the solutions and often have caused gelation of the entire system.

Recently, however, it has been discovered that precipitation of the metal cations can be prevented and clear aqueous solutions of ammonium phosphate can thereby be obtained if acyclic polyphosphate anions are incorporated into the solution either prior to or during neutralization of the acid. The polyphosphate anions chelate the metal cations and thereby prevent their precipitation in salt solutions of neutral or alkaline pH.

I have discovered, however, that the ammonium phosphate solutions so obtained are not completely stable with time and, upon prolonged storage, the metallic impurities begin to precipitate, resulting in a clouding of the solution and ultimately, gelation. I have further discovered that the aforementioned solutions are not entirely stable when diluted with other ammonium salt solutions such as ammonium sulfate, ammonium nitrate, ammonium chloride, ammonium bisulfite, etc. Again, the addition of concentrated ammonium salt solutions to the ammonium phosphate solutions apparently displaces the metallic cations from the chelate structure permitting them to precipitate and form a cloudy or gelled mixture.

It is an object of this invention to prescribe a method for improving the storage stability of ammonium phosphate solutions containing metal cations in a polyphosphate chelate.

It is also an object of this invention to provide a method for preventing the precipitation of the metallic cation impurities from ammonium phosphate solutions containing said metallic impurities in a polyphosphate chelate when said ammonium phosphate solution is diluted with other ammonium salt solutions.

Other and related objects will be apparent from the following disclosure.

I have now discovered that ammonium phosphate solutions containing metallic cation impurities in a polyphosphate chelate can be stored for extended periods without the formation of insoluble precipitates by the addition of ammonia to the solution during storage. Preferably, the ammonia is added at a rate sufficient to maintain a constant pH of the solution by continuous or intermittent addition.

I have further discovered that the aforementioned ammonium phosphate solutions containing metallic cations in a polyphosphate chelate can be admixed with large volumes of other ammonium salt solutions such as ammonium chloride, ammonium nitrate, ammonium sulfate, ammonium bisulfite, etc. by the simultaneous addition thereto of ammonia. Preferably, the amount of ammonia so added is controlled to just avoid the formation of the objectionable precipitates of the metallic cations.

The exact chemical nature of the aqueous ammonium phosphate solution derived from the wet process phosphoric acid is extremely complex, containing as it does, varied amounts of monoammonium and diammonium orthophosphate, all of the aforementioned impurities incidental in wet process phosphoric acid and the aforementioned polyphosphate. The polyphosphate can be present as the ammonium or alkali metal salt obtained, e.g., by the addition of the polyphosphate salt to the acid during neutralization or by concentration of the wet process acid to molecularly dehydrate some of the orthophosphoric acid and form polyphosphoric acid in situ.

In any event, the overall or average composition of this solution can be best expressed in terms of its total nitrogen and phosphorus contents in weight percent, the percent of the total phosphorus that is present as the polyphosphate anion and the pH of the solution. As used hereinafter, all phosphorus concentrations in weight percent will be on a $P_2O_5$ basis in accordance with conventional practice. To achieve maximum solubility in the system, it is desirable to employ solutions having between about 2.60 to 3.75 weight ratios of phosphorus as $P_2O_5$ to nitrogen and a pH value between about 5.5 and 8.5. The exact value of this ratio for optimum solubility depends to a large extent on the amount of polyphosphate present in the solution, generally the greater the polyphosphate content of the solution, the higher the ratio for maximum solubility. To provide a non-corrosive solution, it can be desirable that this ratio be less than about 3.4 and the pH of the solution therefore be between above about 6.0. Solutions having a maximum concentration of about 47 weight percent total nitrogen and phosphorus as $P_2O_5$ can be achieved with a salting out temperature of about 0° centigrade, a ratio of phosphorus as $P_2O_5$ to nitrogen of about 3.2 and a pH of about 7.0. At this optimum solubility, the polyphosphate content of the solution comprises approximately 75 weight percent of the total phosphorus as $P_2O_5$. At lower pH values, e.g., at a pH of 6.0 and $P_2O_5/N$ ratio of 3.4, a total of about 62 weight percent total nitrogen and phosphorus is soluble at 0° centigrade.

As previously mentioned, these solutions have an acyclic polyphosphate present in a sufficient quantity to chelate the metallic cations present as impurities in the solution. If desired, in preparation of such solutions, only the principal gel-forming cations, i.e., iron and aluminum, can be chelated and the remaining impurities can be allowed to precipitate as insoluble orthophosphate salts such as magnesium orthophosphate, cupric orthophosphate, zinc orthophosphate, etc. These precipitates are granular and can be readily separated from the clear solution. The necessary amount of polyphosphate to selectively chelate the gel-forming metallic cations, i.e., iron and aluminum, comprises about 2 atomic weights of phosphorus per atomic weight of iron and aluminum. Accordingly therefore, such solutions contain 1 molecular weight of $P_2O_5$ as a polyphosphate salt, e.g., pyrophosphate, tripolyphosphate, tetrapolyphosphate, etc. for each atomic weight of iron and aluminum. For most wet process acids containing from about 0.5 to about 8 weight percent total iron and aluminum impurities, expressed as oxides, at the 52 weight percent $P_2O_5$ concentration, the resultant polyphosphate content is between about 3 to 35 percent of the total phosphorus present.

Because the precipitation of the remaining impurities as insoluble orthophosphates represents a loss of valuable plant nutrients and additionally requires a filtration step, it is generally desirable to employ a sufficient content of the acyclic polyphosphate to chelate all the metallic cations in the solution. To chelate these cations requires considerably more of the acyclic polyphosphate; in terms of atomic weights of phosphorus per atomic weight of metallic impurity, the following amounts are needed: 12 times magnesium, 4 times zinc, 3 times copper and 2 times vanadium. In general, with most wet process phosphoric acids, the metal impurities other than iron and aluminum comprise from about 0.2 to about 2.0 weight percent, expressed as oxides at the aforementioned 52 weight percent $P_2O_5$ concentration and the total amount of polyphosphate required to chelate all the impurities comprises between about 10 and about 65 percent of the total $P_2O_5$ content.

The acyclic polyphosphate can be incorporated in the ammonium phosphate solution by a variety of methods. In one method, the wet process phosphoric acid, commercially available in concentrations between about 25 to 55 weight percent $P_2O_5$, can be concentrated by the addition of $P_2O_5$ anhydride or by evaporation of its water content until the requisite amount of acyclic polyphosphate is present. Generally, the concentration of the acid so obtained is from 67 to about 79 weight percent expressed as $P_2O_5$ on an impurity free basis and between about 65 and about 76 weight percent expressed as $P_2O_5$ on a bulk concentration basis. The acid is thereafter neutralized with ammonium and diluted with water to the desired ammonium phosphate salt concentration.

Another method comprises the addition of an ammonium or alkali metal polyphosphate salt to the wet process phosphoric acid as it is being neutralized. This is suitably accomplished by the addition of the salt or aqueous solution thereof, e.g., sodium hydrogen pyrophosphate, ammonium hydrogen pyrophosphate, pentapotassium tripolyphosphate, etc. to the neutralization zone or to the acid and/or aqua ammonia stream immediately prior to neutralization. Care is taken to prevent prolonged storage of the polyphosphate in the acid prior to its neutralization so as to avoid hydrolysis of the polyphosphate anion to the ineffective orthophosphate. In either preparation, high temperatures should be avoided in the neutralization zone to avoid hydrolysis of the polyphosphate during neutralization of the acid; generally the zone is cooled to maintain the temperature less than about 175° and preferably less than about 150° F.

As previously mentioned, one embodiment of my invention comprises the addition of ammonia, ether anhydrous or aqua ammonia containing from about 5 to 30 weight percent ammonia, to the aforementioned ammonium phosphate solutions during their storage. I have observed that upon storage the ammonium phosphate solutions decline in pH, i.e., become more acidic. This trend towards an acidic solution accelerates at an increasing rate until the solution becomes unstable and precipitates of the metallic impurities are formed. I have found, however, that the solution can be retained for extended periods of time provided that an alkaline material and preferably ammonia is added thereto during the storage period. Accordingly, therefore, one embodiment of my invention comprises the periodic or intermittent addition of an alkaline material, preferably ammonia, to the aforementioned ammonium phosphate solutions during their storage so as to maintain the pH relatively constant. The amount of alkaline reagent, e.g., ammonia, so added depends on the identity and nature of the ammonium phosphate solution, e.g., its concentration and the amount and identity of the impurities present in the solution. The addition of ammonia can be controlled in any manner apparent to those skilled in the art, e.g., the solution can be sampled at periodic intervals, e.g., once a week or once a month, its pH determined and sufficient ammonia added thereto to restore the pH to its original value. The decline in pH value of the solution, however, follows a known rate depending on the amount of polyphosphate in the solution and its original pH, and accordingly, the amount of ammonia to be added thereto can be predetermined without the need for the periodic analysis. In either case, the amount of ammonia so added is sufficient to at least restore the original pH value and, if desired, to exceed the original pH value. In general, for storage periods from several months to a year or longer the amount of ammonia so added comprises between about 1 and about 35 volume percent of the original composition. Generally, the pH of the solution is maintained at its original level, e.g., between about 6.0 to about 8.5.

The pH of the solution can be raised to above its original value, if desired, when the salting-out temperature of the solution is not thereby raised to above the minimum expected storage temperature. The solubility of the solution decreases with increasing pH and therefore a solution having its pH restored to a greater value than its original pH has a reduced solubility (or increased salting out temperature) than it originally possessed. Accordingly, solutions that are not saturated at their minimum expected storage temperature when at their original composition can often have their pH periodically restored to a value in excess of that originally possessed and the amount of ammonia so added limited only so as to provide a solution having a salting out temperature that does not exceed the minimum expected storage period. In general, the minimum expected storage temperature is at least about 10° C., preferably 5° C. and, most preferably, 0° C.

Another embodiment of my invention comprises the addition of an alkaline agent, i.e., potassium, sodium hydroxide or ammonia to restore the original solution's pH and the addition of water to the solution to restore its original salting out temperature. The decline in pH of the solution during storage is accompanied by a decrease in the solubility and solutions that are saturated at their minimum expected storage temperature often will be super saturated at such temperature when their original pH is restored by the addition of the anhydrous alkaline additive. Accordingly it is within the scope of my invention to also add water to such solutions, the amount of such water addition being from about 1 to about 35 weight percent and controlled to restore the solution's original salting out temperature. The water addition can be independent of ammonia addition, but preferably is combined therewith. As with ammonia addition, the water addition can be controlled by periodically sampling the solution and measuring its salting out (crystallization) temperature. Since the rate of decline in solubility also follows a constant path for each solution depending on the solution's original pH, its polyphosphate anion content and the storage temperature, the necessary time for water addition and amount of water necessary can be predetermined and such amount of water added directly to the solution without need for periodic analysis.

The second embodiment of the invention comprises the addition of ammonia to the ammonium phosphate solution upon admixture of the latter with other ammonium salt solutions. As previously mentioned, the addition of ammonium salt solutions to the ammonium phosphate results in displacement of metallic cations from the polyphosphate chelate. I have found, however, that the incorporation of ammonia in sufficient quantities in the system prevents the formation of the objectionable precipitates. Again, the amount of ammonia so incorporated depends on the identity and the amount of the ammonium salt that is admixed with the ammonium phosphate solution as well as the identity and nature of the impurities present in the ammonium phosphate. In general, from about 0.5 to about 40 weight percent ammonia and preferably from about 1 to about 15 weight percent is added. Anhydrous ammonia or aqua ammonia containing from about 5 to 35 weight percent ammonia can be used, the aqua ammonia being preferred when it is necessary to also add water to maintain the liquid blend's salting out temperature below about 0° C. The ammonia is added in a sufficient quantity to prevent the formation of the objectionable metallic precipitates, the presence of which is readily determined by a turbid or cloudy nature in the solution. Accordingly, the addition of ammonia can be readily controlled by observing the nature of the material upon admixture with the ammonium salt and simultaneously adding thereto a sufficient quantity of ammonia to prevent the formation of such a turbid or cloudy composite solution. It is believed that the addition of ammonia suppresses the ionization of the ammonium salt and thereby retains the ammonium ion concentration sufficiently low that the ammonium ions do not displace the metallic cations from the chelate structure. In general, the amount of ammonia so added should be sufficient to maintain the ammonium ion to polyphosphate anion ratio below about 100:1 and preferably below about 75:1 in the admixed blend. This amount of ammonia can also be controlled by adding sufficient amounts to maintain the blend pH between about 6.5 and 8.5, preferably from 7.5 to 8.5.

As previously mentioned, the ammonium salts admixed with the ammonium phosphate solution comprise the various salts commonly used in preparing liquid blends for fertilizers. Among such are ammonium chloride, ammonium sulfate, ammonium bisulfite, ammonium nitrate and mixtures thereof. Generally such solutions are used at or near saturation at 0° C., however any concentration up to saturation can be used such as from about 5 to 57 weight percent ammonium nitrate, 5 to 42 weight percent ammonium sulfate, 5 to 23 weight percent ammonium chloride and 5 to 70 weight percent ammonium bisulfide and mixtures of such solutions. The admixture of such solutions may in some instances, e.g., the addition of ammonium nitrate to the phosphate solution, require the addition of slight amounts of water to maintain the salting out temperature of the admixed solutions to 0° centigrade or less and this amount of water addition is also within the scope of my invention.

*Example 1*

A typical wet process phosphoric acid having a concentration expressed as $P_2O_5$ of about 53 weight percent, a total impurity content of about 6.5 weight percent and a non-volatile metals content of about 4.1 weight percent calculated as the oxide was slowly heated with a heating mantle until its atmosphere boiling point temperature was about 260° C. During the heating, the acid was continuously stirred to avoid localized overheating while white fumes, chiefly comprising silica, flourine and water vapor were removed. The acid was cooled, sampled and found to have a $P_2O_5$ content of 71 weight percent and a water content of 21 percent. The non-volatile impurities content (by difference) was 8 percent of which about 2.6 weight percent comprises sulfate calculated as sulfur trioxide. The metal impurities (calculated as oxides) had the following distribution:

Weight percent
Aluminum ------------------------------------ 66.0
Iron ---------------------------------------- 19.3
Magnesium ----------------------------------- 2.0
Zinc ---------------------------------------- 4.4
Chromium ------------------------------------ 3.6
Vanadium ------------------------------------ 4.7

Aliquot portions of the acid were diluted with sufficient water to obtain a series of acid samples with decreasing $P_2O_5$ contents at one percent increments from 71 to 63 weight percent $P_2O_5$ contents. These acid samples were held at 65° C. for 24 hours to insure equilibration. Two portions of each of the acids were neutralized to a pH of 6.4 and 7.5, respectively, with 28 percent strength aqueous ammonia at 30° C. to obtain ammonium phosphate solutions of an "8-24-0" and "8-23-0" strength. The total $P_2O_5$ content and orthophosphate content were analyzed in the aqueous ammonium phosphate solution so obtained and their polyphosphate content determined by the difference between the total and ortho $P_2O_5$. It was observed that the amonium phosphates having greater than about 6 percent of their phosphorous as acyclic polyphosphates were free of gelatinous precipitates, but contained slight amounts of crystalline precipitates. Those samples having greater than about 24 percent of their total phosphorus content as acyclic polyphosphates were observed to be clear and free of all precipitates.

The ammonium phosphate solutions were titrated with an aqueous solution of ammonium nitrate until gelatinous precipitates were formed. The ammonium nitrate solution had a weight percent concentration, corresponding to conventional "20-0-0" fertilizer materials. The formation of the gelatinous precipitates was determined visually by noting when the solutions became cloudy. The following table summarizes the results:

TABLE 1

| Sample | Polymeric [1] Phosphate | pH | Maximum Dilution Ratio [2] |
|---|---|---|---|
| 1 | 14 | 6.4 | 0.5 |
| 2 | 14 | 7.5 | 0.8 |
| 3 | 25 | 6.4 | 0.9 |
| 4 | 25 | 7.5 | 1.7 |
| 5 | 38 | 6.4 | 1.5 |
| 6 | 38 | 7.5 | 3.4 |
| 7 | 49 | 6.4 | 2.9 |
| 8 | 49 | 7.5 | 6.4 |
| 9 | 61 | 6.4 | 6.4 |
| 10 | 61 | 7.5 | 10.0 |

[1] Expressed as percent phosphorus as polyphosphate of total phosphorus.
[2] Parts of ammonium nitrate per part of ammonium phosphate.

From the preceding table it can be seen that the ammonium phosphate having the greater amount of ammonia (higher pH) could be admixed with the greatest amount of ammonium salt. The table further shows that greater amounts of polyphosphate also permit greater dilutions with the ammonium salt.

*Example 2*

An aqueous ammonium phosphate solution derived from wet process phosphoric acid was diluted with ammonium nitrate to determine its maximum dilution ratio. The ammonium phosphate had the following properties:

Weight percent
Nitrogen ------------------------------------ 7.4
Total phosphorus (as $P_2O_5$) --------------- 22.2
Orthophosphate (as $P_2O_5$) ------------------ 17.4
Polyphosphate (as $P_2O_5$) -------------------- 4.8
pH ------------------------------------------ 7.3
Aluminum (as $Al_2O_3$) ----------------------- 1.1
Iron (as $Fe_2O_3$) --------------------------- 0.4
Magnesium (as MgO) -------------------------- 0.3

A ten milliliter sample of the ammonium phosphate was titrated with a 57 weight percent ammonium nitrate solution until the solution became cloudy due to the formation of gelatinous precipitates. At this point, 46.2 milliliters of the ammonium nitrate solution had been added and the pH of the material had decreased from 7.3 initially to 6.6.

The experiment was repeated with a second 10 milliliter sample, however in the repeated experiment, the pH was maintained about 7.3 to 7.5 by simultaneous addition of aqua ammonia (10% $NH_3$ by weight). After the addition of 120 milliliters of ammonium nitrate and 1.8 milliliters of aqua ammonia, the solution was clear and free of precipitates. No further amounts of the solutions were added as the original phosphate solution had become so dilute to be ineffective in clouding the composite.

This example illustrates blending techniques to achieve the desired composite liquids. The first technique described comprises the addition of ammonia to the ammonia to the ammonium phosphate prior to admixture with the ammonium nitrate, resulting in raising of the latter's pH from about 6.4 to 7.5. The technique does not always guarantee that ammonium nitrate can be admixed with the phosphate in all proportions as evidenced by the cloudiness of the solution at an ammonium salt/ammonium phosphate ratio of about 4.6 to 1. The preferred method of simultaneous ammoniation of the solutions as they are blended, however, permits any proportion of ammonium salt and ammonium phosphate in the final composite.

Comparable results are achieved by prior or simultaneous addition of ammonia to the ammonium phosphate solution when the latter is admixed with other ammonium salt solution such as a 42 weight percent ammonium sulfate solution, a 10 weight percent ammonium chloride solution or a 15 weight percent ammonium bisulfite solution.

*Example 3*

Typical wet process phosphoric acids containing varied amounts of metallic impurities are concentrated until the polyphosphoric acid content of each of the acids comprises 50 percent of the total phosphorus present. The three samples of acid required respectively 30, 40 and 45 weight percent of the phosphorus as polyphosphate so as to chelate the metallic impurities contained therein. Each of the acids so prepared were thereafter neutralized with ammonia to a pH of 6.5 and 7.5 so as to prepare two ammonium phosphate solutions from each acid sample.

The resultant ammonium phosphate solutions which were clear and free of precipitates after their preparation were thereafter stored for a prolonged period and their behavior upon storage was observed. To a second sample of each of the aforementioned solutions, ammonium was added in periodic amounts so as to maintain the original pH of each solution. The test was continued until precipitates were observed in each of the solutions at which time the days of storage period were recorded and the results as depicted in the following table.

TABLE 2

| Sample | Polyphosphate Required, Percent | Polyphosphate Supplied, Percent | pH | Days Stability Unbuffered | Days Stability Buffered |
| --- | --- | --- | --- | --- | --- |
| 1 | 30 | 50 | 6.5 | 315 | 360 |
| 2 | 30 | 50 | 7.5 | 460 | 590 |
| 3 | 40 | 50 | 6.0 | 55 | 120 |
| 4 | 40 | 50 | 7.5 | 120 | 250 |
| 5 | 45 | 50 | 6.5 | 65 | 70 |
| 6 | 45 | 50 | 7.5 | 95 | 115 |

The aforementioned experiment clearly illustrates the extent of the storage life that can be achieved by the addition of ammonia so as to buffer the pH of the solution and retain it at its original value. If desired, other alkaline materials such as sodium hydroxide or potassium hydroxide, can also be added so as to buffer the pH and retain it at or above its original value. Of such alkali metal hydroxides, potassium is of course preferred since the latter material is also a plant nutrient and credit can be taken for its presence in the solutions.

*Example 4*

An ammonium phosphate solution is prepared from a wet process phosphoric acid that has been concentrated to 79.1 weight percent phosphorus, as $P_2O_5$ on an impurity free basis. The acid contained 85 percent of its phosphorus content as polyphosphoric acids. At this concentration, the incident impurities of the acid were:

| | Weight percent |
| --- | --- |
| Sulfate (as $SO_3$) | 3.6 |
| Magnesium (as MgO) | 0.8 |
| Iron (as $Fe_2O_3$) | 1.1 |
| Aluminum (as $Al_2O_3$) | 3.5 |

To completely chelate the iron, aluminum and magnesium impurities 40 percent of the acid's phosphorus content was needed in the form of an acyclic polyphosphate.

The acid is neutralized in a cooled reactor maintained at 70° C. to a pH of 6.5 by the addition of aqua ammonia. The inventory of solution maintained in the reactor and the heat exchanger is such that the solution's residence time at the neutralization temperature is 3 hours and the resultant product contains 75 percent of its phosphorus content as acyclic polyphosphate anions. Sufficient water is added during neutralization to obtain an ammonium phosphate solution containing a total of 46 weight percent of nitrogen and phosphorus, as $P_2O_5$. The ratio of $P_2O_5$ to nitrogen is 3.28 and the impurity content is as follows:

| | Weight percent |
| --- | --- |
| Sulfate (as $SO_3$) | 1.8 |
| Magnesium (as MgO) | 0.4 |
| Iron (as $Fe_2O_3$) | 0.5 |
| Aluminum (as $Al_2O_3$) | 1.7 |

The solution is divided into two portions and stored at 20° centigrade. The first portion is not disturbed during storage and after 250 days the salting out temperature of the solution exceeds 0° C. The pH of the solution at this time has declined to about 6.1. After 390 days of storage, the solution begins to become cloudy because of precipitation of the metallic impurities indicating its maximum unbuffered storage life.

The second portion of the acid is also stored at 20° C., however, every 30 days, 3.6 pounds of anhydrous ammonia are added per 10,000 pounds of the solution so as to maintain the latter's pH at 6.5, its original value. After 120 days the solution's salting out temperature reaches 0° C. and thereafter 15.3 gallons of water are added to each 10,000 pounds of the original ammonium phosphate solution. The solution does not become cloudy until after about 450 days of storage and the storage life of the solution was thus extended about two months or about 15.5 percent by practicing my invention.

The preceding examples are intended solely to illustrate the practice of my invention and to demonstrate results obtainable thereby. While the preceding disclosure has been specifically directed to the storage and handling of ammonium phosphate solutions derived from wet process phosphoric acid and containing congeneric or incident metal impurities in a polyphosphate chelate it is apparent that the invention is equally applicable to ammonium phosphate solutions derived from "super" white or furnace grade acids that contain polyphosphoric acids to which comparable amounts of metal cations have been added as plant nutrients such as iron chloride, aluminum sulfate, magnesium chloride, etc. It is not intended that these examples be unduly limiting of my invention that is set forth by the method steps and their equivalents in the following claims.

I claim:

1. In a method for storing and handling of an ammonium phosphate solution having an initial pH between about 5.5 and 10.0 and containing metallic cations that normally form insoluble orthophosphate salts in solution but that are retarded from forming such insoluble salts by chelation with polyphosphate anions, the improved method for preventing the formation of insoluble salts of metallic cations during said storing and handling that comprises adding to said solution, during the storage of said solution and upon the admixture of said solution with other ammonium salt solutions, between about 0.5 and 40 weight percent ammonia in an amount sufficient to prevent the pH of said solution from declining to less than said initial value.

2. The method of claim 1 that comprises the periodic addition of ammonia to said ammonium phosphate solution during storage of said solution, and controlling the amount of said ammonia to maintain the pH of said solution at a value above about 5.5 without raising the salting out temperature of said solution above about 0° C.

3. The method of claim 2 wherein the step of adding said ammonia is controlled so as to maintain the pH of said solution at its original value of between about 5.5 and 10.0.

4. The method for storing an ammonium phosphate solution having a pH between about 6.5 and 8.5 and containing metallic cations that normally form insoluble orthophosphate salts in said solution but are retarded from forming such insoluble salts by chelation with polyphosphate anions that comprises holding said solution in storage and maximizing the useful storage life of said solution and preventing the formation of insoluble salts of said metallic cations during said storage by maintaining the pH of said solution between about 6.5 and 8.5 during said storage by the addition thereto of an alkali selected from the class consisting of sodium and potassium hydroxide, ammonia and mixtures thereof.

5. The method of claim 4 comprising the further step of adding water to said solution to maintain the salting out temperature of said solution above the minimum expected storage temperature.

6. The method for preparing stable, mixed blends comprising an aqueous solution of a first ammonium salt selected from the class consisting of ammonium nitrate, ammonium sulfate, ammonium chloride, ammonium bisulfite and mixtures thereof with an aqueous solution of ammonium phosphate that has a pH between about 5.5 and 10.0 and that contains metallic cations comprising iron and aluminum cations and a sufficient amount of polyphosphate anions to chelate said iron and aluminum, said method comprising adding said aqueous solution of said first ammonium salt to said aqueous solution of ammonium phosphate while simultaneously adding between about 0.5 and 40 weight percent ammonia thereto in an amount controlled to maintain the pH of said solution of ammonium phosphate between about 5.5 and 10.0 and thereby prevent the formation of insoluble salts of said iron and aluminum cations and recovering a clear, aqueous ammoniacal blend of said first ammonium salt and said ammonium that is phosphate free of precipitates.

7. The method of claim 6 wherein the amount of said ammonia so added is controlled to provide a pH in said aqueous ammoniacal blend of first salt and ammonium phosphate between about 6.5 and 8.5.

8. The method of claim 6 wherein said ammonia is added in an amount sufficient to suppress the ionization of said first ammonium salt and ammonium phosphate and thereby maintain the ratio of ammonium ions to said polyphosphate anions below about 75:1.

9. The method of claim 6 comprising the steps of observing the clarity of said clear, aqueous ammoniacal blend and increasing the amount of said ammonia added to said blend when a perceptible amount of said insoluble salts is observed.

References Cited by the Examiner
UNITED STATES PATENTS 3,044,851   7/1962   Young _____ 23—165
3,057,711   10/1962  Reusser et al. _____ 23—165

DONALL H. SYLVESTER, *Primary Examiner.*

ANTHONY SCIAMANNA, *Examiner.*

T. D. KILEY, *Assistant Examiner.*